(12) United States Patent
Saito et al.

(10) Patent No.: US 11,212,174 B2
(45) Date of Patent: Dec. 28, 2021

(54) NETWORK MANAGEMENT DEVICE AND NETWORK MANAGEMENT METHOD

(71) Applicant: Nippon Telegraph and Telephone Corporation, Tokyo (JP)

(72) Inventors: Masatoshi Saito, Tokyo (JP); Satoshi Nakatsukasa, Tokyo (JP); Ken Takahashi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/270,293

(22) PCT Filed: Aug. 20, 2019

(86) PCT No.: PCT/JP2019/032427
§ 371 (c)(1),
(2) Date: Feb. 22, 2021

(87) PCT Pub. No.: WO2020/040133
PCT Pub. Date: Feb. 27, 2020

(65) Prior Publication Data
US 2021/0184926 A1 Jun. 17, 2021

(30) Foreign Application Priority Data
Aug. 23, 2018 (JP) .............................. JP2018-156428

(51) Int. Cl.
*H04L 12/24* (2006.01)
*H04L 12/26* (2006.01)
*H04L 29/08* (2006.01)

(52) U.S. Cl.
CPC .... *H04L 41/0816* (2013.01); *H04L 29/08189* (2013.01); *H04L 41/0806* (2013.01);
(Continued)

(58) Field of Classification Search
CPC ... H04L 29/08135–0827; H04L 41/0813–082; H04L 41/0876–0896;
(Continued)

(56) References Cited

U.S. PATENT DOCUMENTS 10,148,592 B1 * 12/2018 Pai ...................... H04L 41/0681
10,409,642 B1 * 9/2019 Tang ..................... G06F 9/5061
(Continued)

FOREIGN PATENT DOCUMENTS

JP     2017-147517     8/2017

OTHER PUBLICATIONS

Kim et al., "Improving Network Management with Software Defined Networking," IEEE Communications Magazine, 2013, pp. 114-119.

*Primary Examiner* — Brendan Y Higa
(74) *Attorney, Agent, or Firm* — Fish & Richardson P.C.

(57) ABSTRACT

[Problem] To realize highly flexible network management in accordance with a parameter on which a user places importance.
[Solution] A controller 1 has: a request input/output unit 12 configured to store an input request configuration in a configuration management unit 17; a measurement information processing unit 13 configured to acquire measurement information of a device 5 designated as a request parameter or measurement information of a server 4 that accommodates one or more devices 5 and store the acquired measurement information in a measurement management database 14; a measurement control unit 15 configured to determine whether or not the measurement information in the measurement management database 14 satisfies a request conditional expression and activate a corresponding requested action when the request conditional expression is determined to be satisfied; and an apparatus setting unit 16
(Continued)

configured to set setting information that follows the activated requested action in the device 5 or the server 4.

8 Claims, 17 Drawing Sheets

(52) U.S. Cl.
CPC .......... *H04L 41/0896* (2013.01); *H04L 41/22* (2013.01); *H04L 43/06* (2013.01); *H04L 43/0805* (2013.01); *H04L 43/0876* (2013.01); *H04L 43/10* (2013.01); *H04L 43/16* (2013.01); *H04L 67/1012* (2013.01)

(58) Field of Classification Search
CPC ......... H04L 43/0876–16; H04L 47/125; H04L 67/10–1031; H04L 41/22; H04L 43/08–16
See application file for complete search history.

(56) References Cited

U.S. PATENT DOCUMENTS

| | | | | |
|---|---|---|---|---|
| 10,412,022 | B1* | 9/2019 | Tang | H04L 41/0896 |
| 10,764,132 | B2* | 9/2020 | Ding | H04L 41/0816 |
| 2008/0183876 | A1* | 7/2008 | Duvur | H04L 67/1017 |
| | | | | 709/228 |
| 2015/0213087 | A1* | 7/2015 | Sikri | G06F 11/3409 |
| | | | | 707/713 |
| 2015/0304176 | A1* | 10/2015 | Ting | G06Q 30/0283 |
| | | | | 709/203 |
| 2016/0323377 | A1* | 11/2016 | Einkauf | H04L 29/0827 |
| 2017/0339158 | A1* | 11/2017 | Lewis | H04L 63/205 |
| 2018/0018195 | A1* | 1/2018 | Kim | H04L 41/0813 |
| 2018/0046477 | A1* | 2/2018 | Aelken | G06F 9/5072 |

\* cited by examiner

| ORDER OF PRIORITY | REQUEST CONDITIONAL EXPRESSION | REQUESTED ACTION |
|---|---|---|
| 1 | REQUEST PARAMETER A > FIRST THRESHOLD VALUE | LEVELING |
| 2 | LEVELING RESULT = FALSE (FAILURE) | SCALE-OUT |
| 3 | REQUEST PARAMETER A < SECOND THRESHOLD VALUE | SCALE-IN |

| SERVER | DATABASE | | | COLLECTOR | | | DEVICE | | |
|---|---|---|---|---|---|---|---|---|---|
| ID | ID | A:P | ATTRIBUTE | ID | A:P | ATTRIBUTE | ID | A:P | ATTRIBUTE |
| 1 | 1 | 192.168.*.*:* | * | 1 | 192.168.*.*:* | * | D1 | 192.168.*.*:* | * |
| | | | | | | | D2 | 192.168.*.*:* | * |
| 2 | 2 | 192.168.*.*:* | * | 2 | 192.168.*.*:* | * | D3 | 192.168.*.*:* | * |
| | | | | | | | D4 | 192.168.*.*:* | * |
| | | | | | | | D5 | 192.168.*.*:* | * |
| 3 | 3 | 192.168.*.*:* | * | 3 | 192.168.*.*:* | * | D6 | 192.168.*.*:* | * |
| | | | | | | | D7 | 192.168.*.*:* | * |
| | | | | 4 | 192.168.*.*:* | * | D8 | 192.168.*.*:* | * |
| | | | | | | | D9 | 192.168.*.*:* | * |
| | | | | | | | D10 | 192.168.*.*:* | * |

Fig. 4

NETWORK MANAGEMENT DEVICE AND NETWORK MANAGEMENT METHOD

CROSS-REFERENCE TO RELATED APPLICATIONS

This application is a National Stage application under 35 U.S.C. § 371 of International Application No. PCT/JP2019/032427, having an International Filing Date of Aug. 20, 2019, which claims priority to Japanese Application Serial No. 2018-156428, filed on Aug. 23, 2018. The disclosure of the prior application is considered part of the disclosure of this application, and is incorporated in its entirety into this application.

TECHNICAL FIELD

The present invention relates to a network management apparatus and a network management method.

BACKGROUND ART

Network virtualization technologies such as a software-defined network (SDN) have facilitated flexible changes in network resource allocation. Non Patent Literature 1 describes an overview regarding how network management tasks are improved through the SDN.

Patent Literature 1 describes a calculation section that calculates allocated resources by solving a mathematical optimization problem to minimize a penalty having a user demand penalty that increases as a difference between an allocation resource and an allocation requested resource increases. It is thus possible to calculate resource allocation to satisfy a user demand.

FIG. 19 is a configuration diagram of a measurement management system. The measurement management system is configured of a controller 91 and a measurement target network system managed by the controller 91.

Devices D, a collector 93, and a database 92 are connected to the measurement target network system. The collector 93 and the database 92 are accommodated together in a server 94 that is in a single case body.

Each device D transmits data such as a traffic amount to the collector 93 using a push-type information notification function (such as xflow or telemetry). The collector 93 stores data transmitted from each device D in the database 92.

The controller 91 acquires data from the database 92 in response to a query described in a structured query language (SQL) or the like. The controller 91 then visualizes the acquired data as measurement information and thus allows a maintenance engineer to recognize a current situation of the measurement target network system.

CITATION LIST

Non Patent Literature

Non Patent Literature 1: Hyojoon Kim et al., "Improving Network Management with Software Defined Networking", IEEE Communications Magazine, February 2013, pp. 114 to 119

Patent Literature

Patent Literature 1: JP 2017-147517A

SUMMARY OF THE INVENTION

Technical Problem

FIG. 20 is a configuration diagram showing a case when a measurement target network is increased in scale. In the case of such a large-scale network, many devices D are geographically dispersed, and data from devices D at distant locations may thus arrive at the collector 93 with a delay. In such a case, a maintenance engineer operates a controller and performs an operation of changing the collector 93 that is a connection target of the devices D in order to improve the delay time from the devices D to the collector 93.

On the other hand, another maintenance engineer may prioritize shortening a turnaround time (TAT), which is a time required for responding to a query after the query is transmitted from the controller 91 to the database 92.

Because different maintenance engineers place importance on various different parameters in this manner, individual maintenance engineers manually perform, in their own way, specific network management operations, such as determination of how a measurement target network is to be improved after recognizing measurement information visualized by the controller 91 and what kind of control command is to be issued for the devices D. However, loads of the network management operations have increased with an increase in scales of the measurement target networks.

Although the related arts such as Non Patent Literature 1 and Patent Literature 1 describe collection of measurement information from each device D to the controller 91, an information utilization aspect regarding what network management operations are to be specifically performed thereafter on the basis of the collected measurement information is not discussed.

A main object of the present invention is thus to realize highly flexible network management in accordance with a parameter on which a user places importance.

Means for Solving the Problem

In order to solve the aforementioned problem, a network management apparatus according to the present invention has the following features.

The present invention includes a request input unit configured to receive an input of a request configuration in which a request conditional expression that is a calculation expression using a request parameter is associated with a requested action that is activated when the request conditional expression is satisfied and to store the input request configuration in a configuration management unit, a measurement information processing unit configured to acquire measurement information of a device designated as the request parameter or measurement information of a server that accommodates one or more devices including the device and store the acquired measurement information in a measurement management database, a measurement control unit configured to determine whether or not the measurement information in the measurement management database satisfies the request conditional expression and to activate the corresponding requested action when the request conditional expression is determined to be satisfied, and an apparatus setting unit configured to set setting information that follows the activated requested action in the device or the server.

In this manner, the setting information that follows the requested action is automatically set in the device or the server through a monitoring process regarding whether or not the measurement information that is the request parameter satisfies the request conditional expression. It is thus possible to realize highly flexible network management in accordance with a request parameter on which a user places importance.

According to the present invention, the measurement control unit has a leveling unit configured to level loads between the servers, as the requested action, and the request input unit stores the request configuration indicating that the leveling unit is to be called in the configuration management unit when the measurement information designated as the request parameter exceeds a first threshold value.

In this manner, there is no need for a maintenance engineer to perform leveling of loads between the servers, and leveling processing is automatically activated in accordance with the latest measurement information and the request configuration.

According to the present invention, the measurement control unit has a scale-out unit configured to address expansion of the server that is new as the requested action, and the request input unit stores the request configuration indicating that the scale-out unit is to be called in the configuration management unit when the measurement information designated as the request parameter exceeds the first threshold value even after leveling the loads is performed by the leveling unit.

In this manner, there is no need for the maintenance engineer to manually set the scale-out, and scale-out processing is automatically activated in accordance with the latest measurement information and the request configuration.

According to the present invention, the measurement control unit has a scale-in unit configured to address reduction of the server that is existing as the requested action, and the request input unit stores the request configuration indicating that the scale-in unit is to be called in the configuration management unit when the measurement information designated as the request parameter is below a second threshold value.

In this manner, there is no need for the maintenance engineer to manually set the scale-in, and scale-in processing is automatically activated in accordance with the latest measurement information and the request configuration.

Effects of the Invention

According to the present invention, it is possible to realize highly flexible network management in accordance with a parameter on which a user places importance.

BRIEF DESCRIPTION OF DRAWINGS

FIG. 4 is a configuration diagram of a measurement management database targeted at the network system in FIG. 3 according to the embodiment.

DESCRIPTION OF EMBODIMENTS

Hereinafter, an embodiment of the present invention will be described in detail with reference to the drawings.

Figures 1, 2:
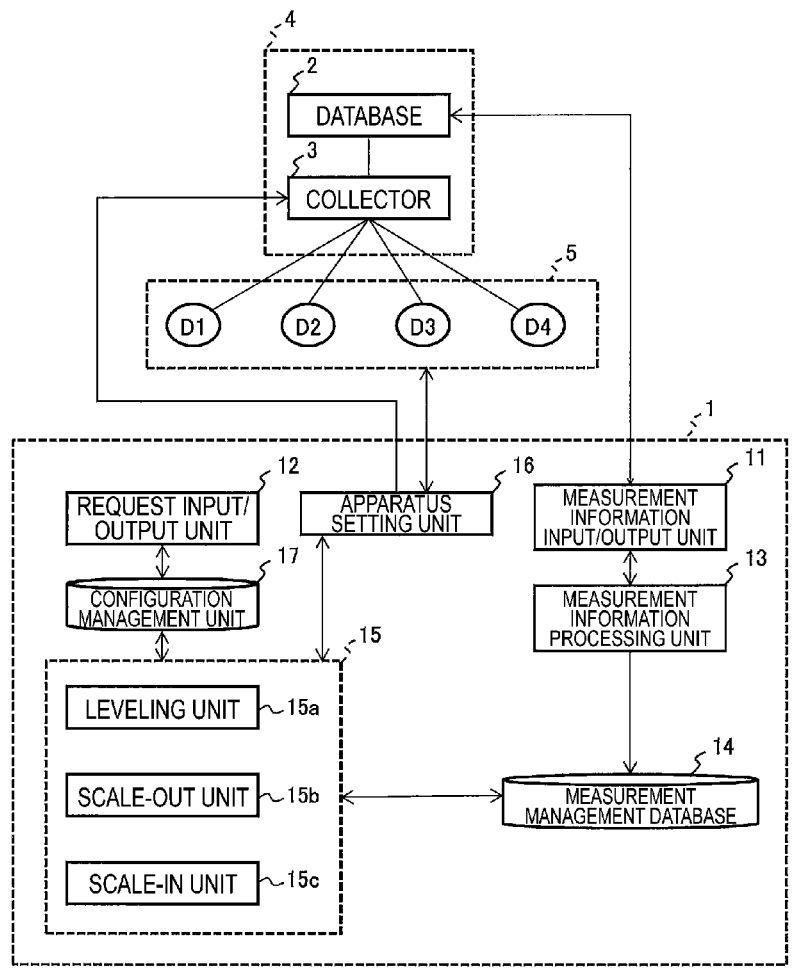
FIG. 1 is a configuration diagram of a measurement management system according to an embodiment.
FIG. 2 is a table illustrating an example of a request configuration that a configuration management unit manages according to the embodiment.

FIG. 1 is a configuration diagram of a measurement management system. The measurement management system is configured of a controller (network management apparatus) 1 and a network system that the controller 1 manages. The network system that is a target of the management is configured of a server 4 including a database 2 and a collector 3 and devices 5 that are network equipment. Hereinafter, it is assumed that device IDs such as "D1" are allocated to the individual devices 5.

Figure 19:
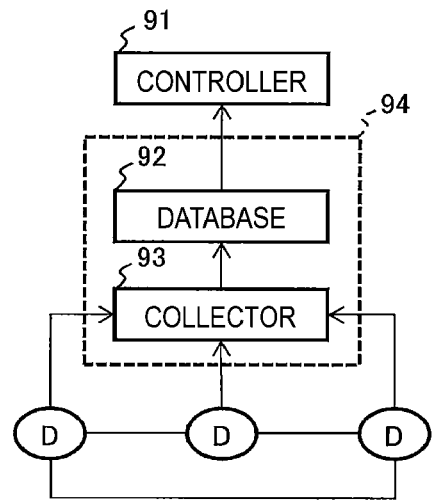
FIG. 19 is a configuration diagram of the measurement management system.
Figure 20:
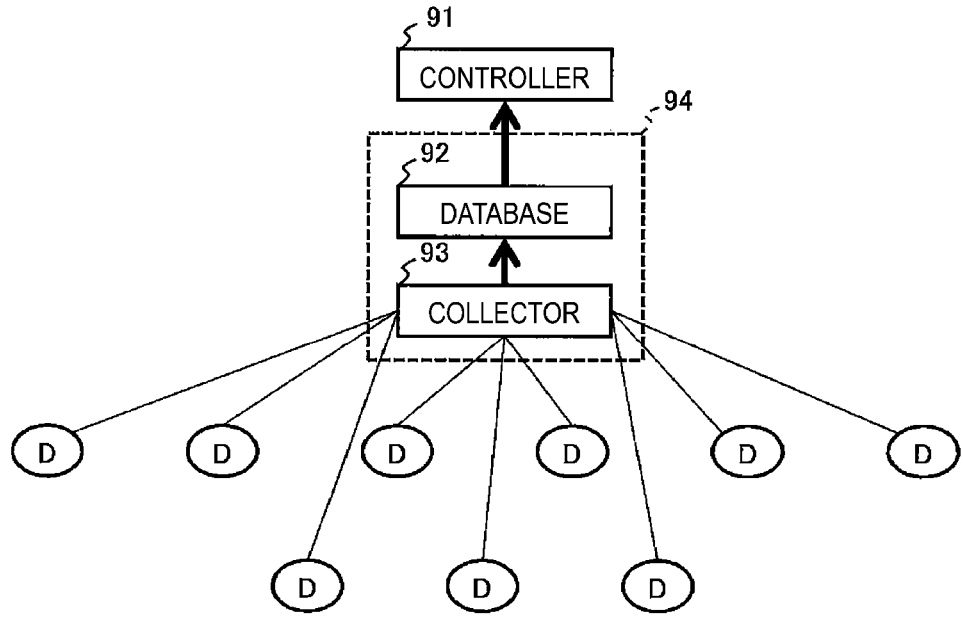
FIG. 20 is a configuration diagram showing when the measurement target network is increased in scale.

The database 2, the collector 3, the server 4, and the devices 5 in FIG. 1 have the same functions as a database 92, a collector 93, a server 94, and devices D in FIG. 19, respectively. A database ID, a collector ID, a server ID, and device IDs are allocated as identifiers to the database 2, the collector 3, the server 4, and the devices 5, respectively.

The controller 1 is configured as a computer that has a central processing unit (CPU), a memory, a storage means (storage unit), examples of which include a hard disk, a nonvolatile memory, and a solid state drive (SSD), and a network interface.

In this computer, the CPU executes a program (also referred to as an application or an app that is an abbreviation thereof) loaded into a memory, thereby operating a control unit (control means) configured of each processing unit.

The controller 1 has a measurement information input/output unit 11, a request input/output unit (request input unit) 12, a measurement information processing unit 13, a measurement management database 14, a measurement control unit 15, an apparatus setting unit 16, and a configuration management unit 17.

The measurement information input/output unit 11 receives an input of measurement information from the server 4 and notifies the measurement information processing unit 13 of the measurement information. The measurement information input/output unit 11 follows an instruction from the measurement control unit 15 and outputs a signal for designating a transfer destination of the measurement information to the server 4.

The request input/output unit 12 receives a request from the maintenance engineer and writes the request as a request configuration in the configuration management unit 17.

FIG. 2 is a table illustrating an example of a request configuration that the configuration management unit 17 manages.

The request configuration is setting information in which one or more combinations of request conditional expressions and requested actions are aligned in order of priority.

The request conditional expression is an expression for determining whether or not a measurement result of a request parameter has exceeded a threshold value set in advance. Alternatively, any logic including an additional parameter other than the request parameter may be defined as a request conditional expression.

The request parameter is a parameter on which the maintenance engineer places importance as a target of monitoring. Note that not only a type of the request parameter but also a monitoring cycle of each request parameter may be designated. The requested action is an action (processing) executed by the measurement control unit 15 when the request conditional expression is satisfied (when the threshold value is determined to be exceeded).

For example, three requested actions are registered in association with corresponding request conditional expressions in order of leveling, scale-out, and scale-in, in the configuration management unit 17 in FIG. 2. Each requested action is activated in order of (1) to (3) below.

(1) The requested action of leveling is activated when a request conditional expression "request parameter A>first threshold value" is satisfied.
(2) The requested action of scale-out is activated when a request conditional expression "requested action of leveling has failed" is satisfied.
(3) The requested action of scale-in is activated when a request conditional expression "request parameter A<second threshold value" is satisfied.

Returning to FIG. 1, a leveling unit 15a, a scale-out unit 15b, and a scale-in unit 15c are provided in the measurement control unit 15 as an example of the processing unit that executes a requested action, in the embodiment.

Also, the request input/output unit 12 may notify (recommend) the maintenance engineer of a requested action corresponding to a request conditional expression when the request conditional expression is satisfied, and execute the requested action when approval of the recommendation is received from the maintenance engineer.

For example, the controller 1 obtains network information without missing using a request configuration for calling the leveling unit 15a when a turn around time (TAT) between the controller 1 and the database 2 is defined as a request parameter and the TAT is equal to or greater than a predetermined threshold value as a request conditional expression.

Alternatively, it is possible to collect information with necessary minimum resources by using a request configuration for calling the scale-out unit 15b when the amount of used resources of the server 4 is defined as a request parameter and the amount of used resources is equal to or greater than a predetermined threshold value as a request conditional expression and calling the scale-in unit 15c when the amount of used resources is equal to or less than a predetermined threshold value.

The measurement information processing unit 13 works the measurement information received from the server 4 via the measurement information input/output unit 11 and writes the result of working in the measurement management database 14. The working processing is, for example, format unifying processing of the measurement information and calculation processing of a request parameter (such as a traffic amount) from the measurement information (such as IF counter information of the devices 5).

The measurement management database 14 maintains, as an "attribute", a measurement result of a request parameter for each apparatus in the network system in addition to topology information (connection relationships between the devices 5 and the server 4) of the network system that is a target of management. The request input/output unit 12 thus registers the topology information input by the maintenance engineer into the measurement management database 14.

The measurement control unit 15 monitors the request parameter read from the configuration management unit 17 for each apparatus registered in the measurement management database 14. When the request parameter of the monitoring result satisfies the request conditional expression, the measurement control unit 15 then calls the processing unit (the leveling unit 15a, the scale-out unit 15b, and the scale-in unit 15c) in accordance with the type of the corresponding requested action. In response to the calling, the apparatus setting unit 16 executes network control on the devices 5 and the server 4 via various setting tools such as a command line interface (CLI) and a Netconf, and thus attempts to improve the request parameter.

Note that these three types of processing units may not only be able to be called from the measurement control unit 15 but may also individually and independently allow direct operation by the maintenance engineer via the request input/output unit 12. This enables resource control to be performed outside the monitoring process.

Figure 3:
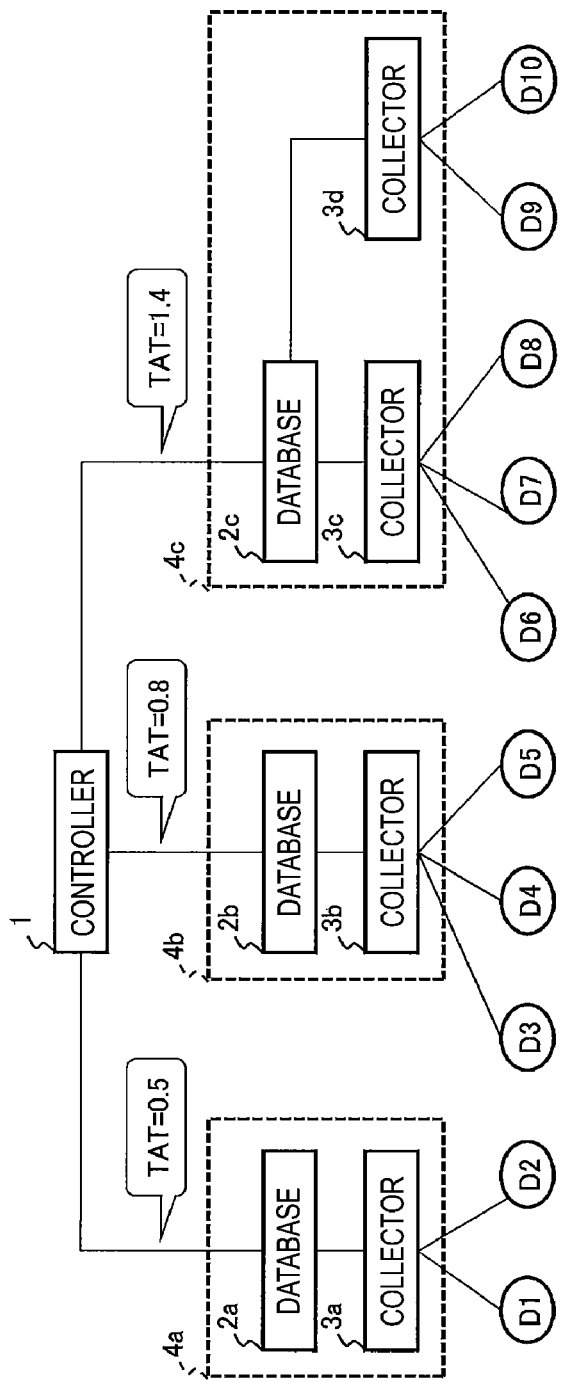
FIG. 3 is a configuration diagram of a network system that is a target of management performed by the measurement management system according to the embodiment.

FIG. 3 is a configuration diagram of a network system that is a target of management performed by the measurement management system.

In the network system that a single controller 1 manages, three servers 4 (4a to 4c) including three databases 2 (2a to 2c) and four collectors 3 (3a to 3d) that collect measurement information from ten devices 5 (D1 to D10).

TATs between the controller 1 and the three databases 2 (2a to 2c) are as illustrated in FIG. 3.

FIG. 4 is a configuration diagram of the measurement management database 14 targeted at the network system in FIG. 3.

In the measurement management database 14, topology information of the network system in FIG. 3 is described as association in a record. For example, information of the server 4a that accommodates the database 2a, the collector 3a, and the devices 5 (D1, D2) is registered in the first row in the measurement management database 14. Note that as an identifier of each apparatus, a column in which address information (A: Address) of the apparatus and a port number (P: Port) of the apparatus are sectioned with ":" is provided as "A:P" along with an ID in the measurement management database 14.

Further, an attribute of each database 2, an attribute of each collector 3, and an attribute of each device 5 are also stored as request parameters in the measurement management database 14.

Figure 5:
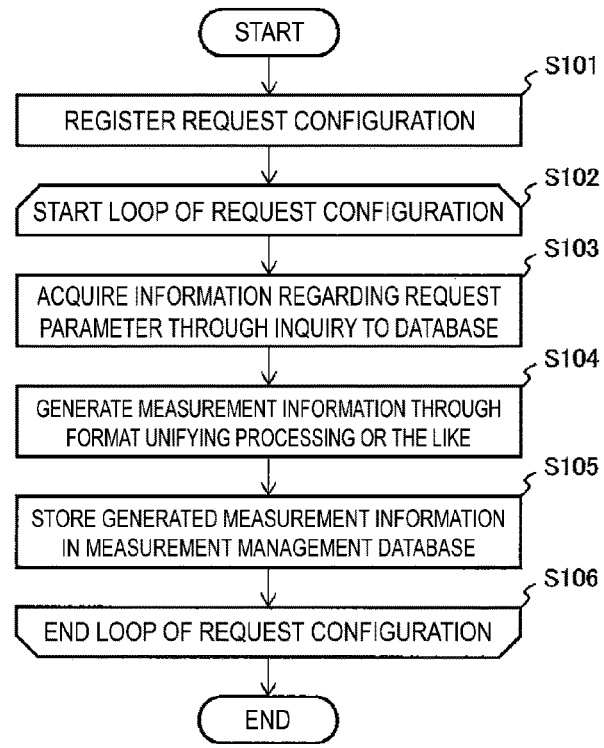
FIG. 5 is a flowchart illustrating initial setting processing of a controller according to the embodiment.

FIG. 5 is a flowchart illustrating initial setting processing of the controller 1.

In S101, the request input/output unit 12 receives an input of a request configuration in which a request parameter, a request conditional expression, and a requested action are associated, and registers the request configuration in the configuration management unit 17.

In S102, the measurement information input/output unit 11 reads the request configuration from the configuration management unit 17 and starts a selected loop one by one in accordance with an order of request configurations.

In S103, the measurement information input/output unit 11 acquires information regarding the request parameter of the request configuration that is being selected in the loop through an inquiry using an SQL or the like to the database 2.

In S104, the measurement information processing unit 13 generates measurement information through format unifying processing or the like from the information acquired in S103.

In S105, the measurement information processing unit 13 stores the measurement information generated in S104 as an attribute of the measurement management database 14.

In S106, the measurement information input/output unit 11 ends the loop of the request configuration from S102.

Figure 6:
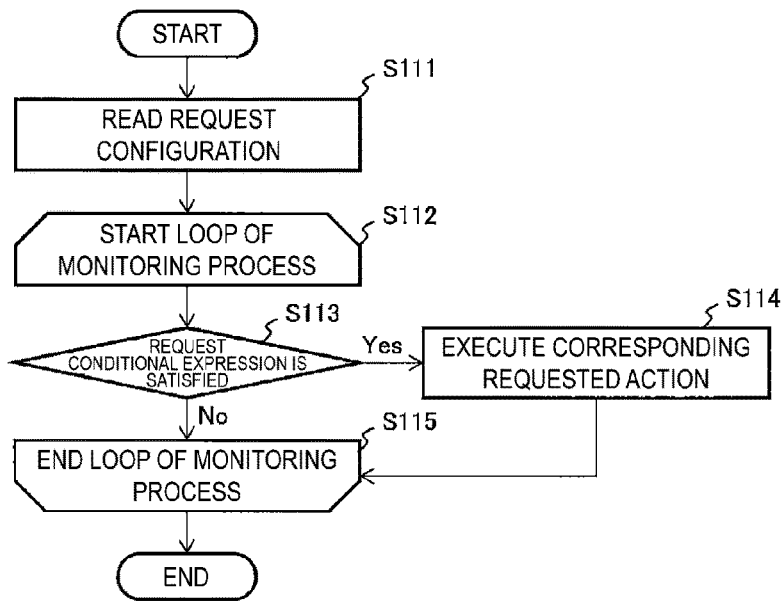
FIG. 6 is a flowchart illustrating network system monitoring processing performed by the controller according to the embodiment.

FIG. 6 is a flowchart illustrating monitoring processing of the network system performed by the controller 1.

In S111, the request input/output unit 12 reads the request configuration input in S101 from the configuration management unit 17.

In S112, the measurement control unit 15 starts a loop for causing the monitoring process to operate at a predetermined monitoring cycle for the request configuration read in S111.

In S113, the measurement control unit 15 determines whether or not the request parameter (the attribute of the measurement management database 14 stored in S105) of the request configuration in the loop satisfies the request conditional expression of the request configuration. From S113, the processing proceeds to S114 in the case of Yes, and to S115 in the case of No.

In S114, the measurement control unit 15 executes a corresponding requested action for the request configuration that satisfies the request conditional expression.

In S115, the measurement control unit 15 ends the loop of the request configuration from S112.

Figure 7:
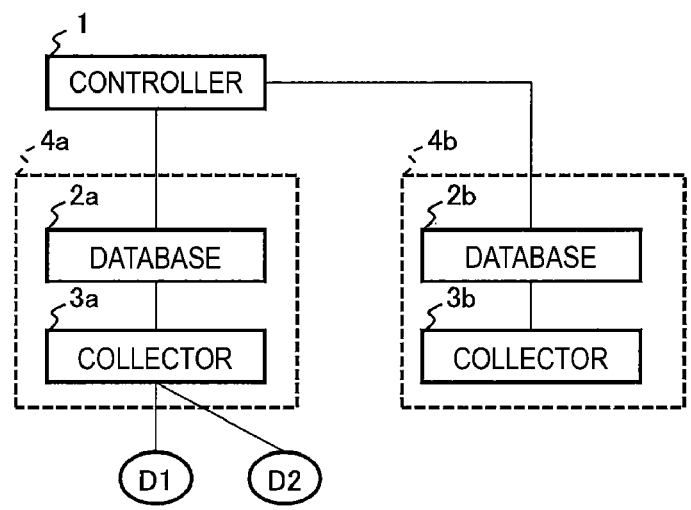
FIG. 7 is an explanatory diagram illustrating an overview of leveling between servers according to the embodiment.
Figure 7:
Figure 7:
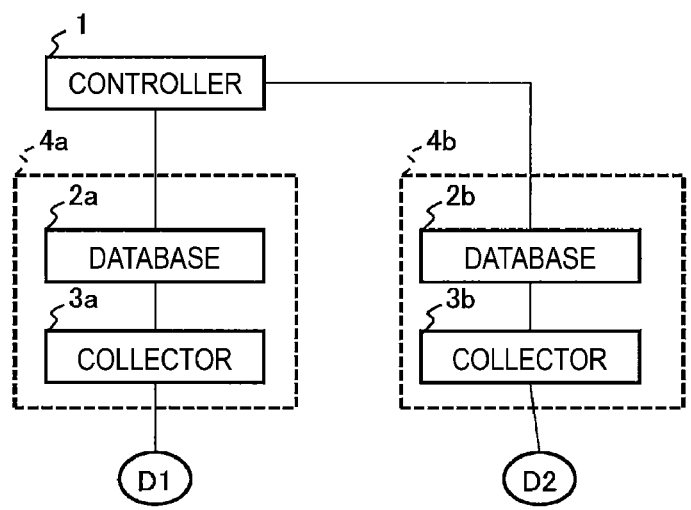

Hereinafter, details of the leveling unit 15a will be described with reference to FIGS. 7 to 10. FIG. 7 is an explanatory diagram illustrating an overview of leveling between the servers 4. Prior to the leveling, the two devices 5 (D1, D2) are accommodated only in the collector 3a, and a load is localized, despite the fact that the two collectors 3 are present.

The accommodation destination of the device 5 (D2) is changed from the collector 3a to the collector 3b by being triggered by a destination change instruction from the leveling unit 15a. In this manner, a state in which one device 5 is accommodated in each of the two collectors 3 is achieved, and the load is leveled. In this manner, the leveling of the apparatus allocation contributes especially to leveling of TATs and leveling of traffic amounts.

Figure 8:
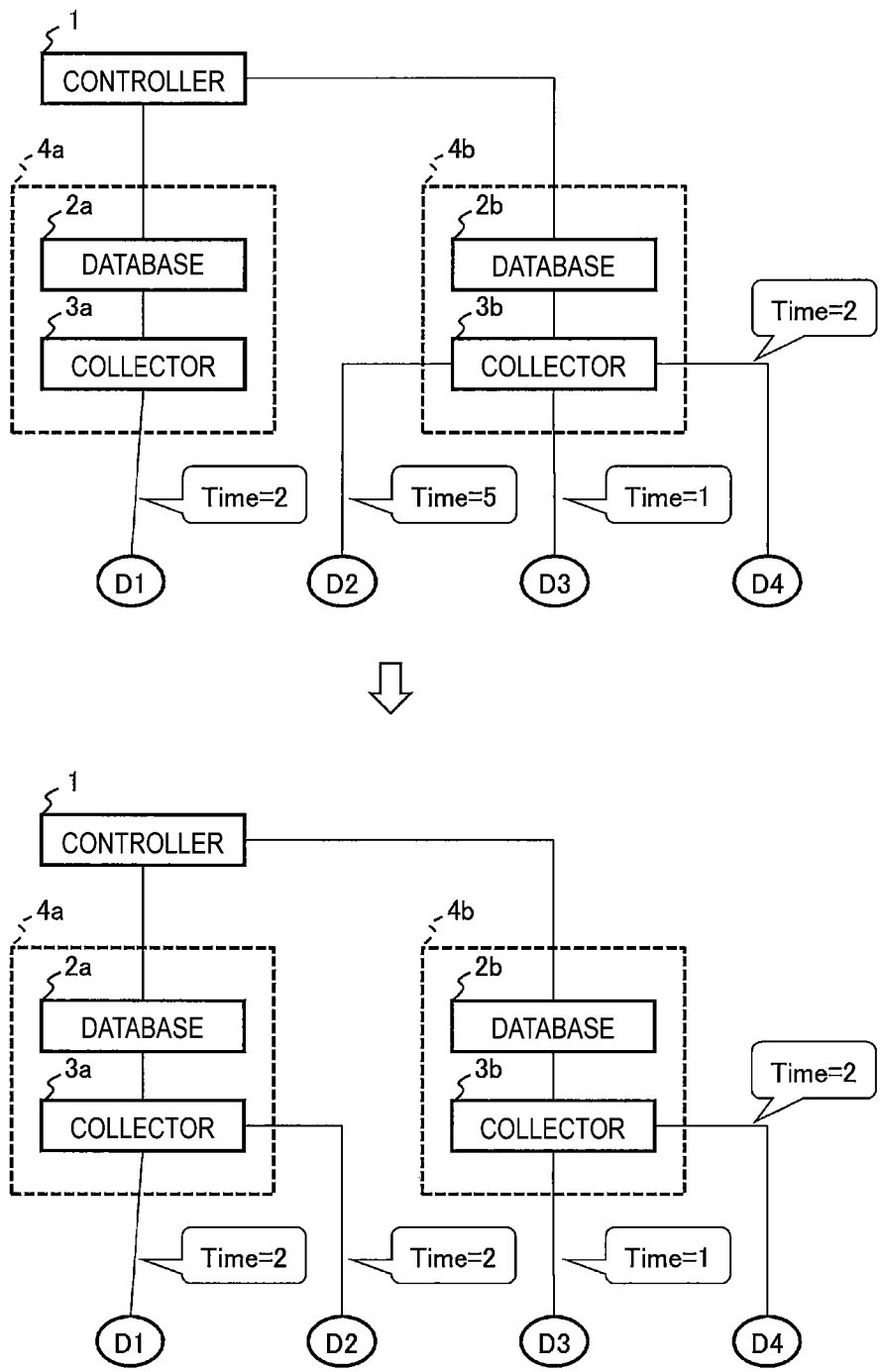
FIG. 8 is an explanatory diagram illustrating processing for improving, through the leveling, response times (Time) between devices and a collector according to the embodiment.

FIG. 8 is an explanatory diagram illustrating processing for improving response times (Time) between the devices 5 and the collector 3 through leveling.

Figure 9:
FIG. 9 is a configuration diagram of a measurement management database that shows an improvement effect through the leveling in FIG. 8 according to the embodiment.

FIG. 9 is a configuration diagram of the measurement management database 14 that shows an improvement effect of the leveling in FIG. 8.

First, it is assumed that the configuration management unit 17 has registered the following request configuration: a request conditional expression "Time≥3"→a requested action "leveling".

In a first stage (a measurement management database 14a1 in FIG. 9), response times between four devices 5 (D1 to D4) and the collectors 3 are 2, 5, 1, and 2 in order, and a device 5 (D2) that exceeds a threshold value=3 of the request conditional expression is present. Methods of measuring Time includes a method of executing a ping between the devices 5 and the collectors 3, for example.

In a second stage (a measurement management database 14a2 in FIG. 9), Time of the device 5 (D2) is improved to be 2 by the accommodation destination of the device 5 (D2) being changed from the collector 3b to the collector 3a. Note that the server 4a including the collector 3a is selected as a leveling destination server that conforms to a leveling policy, by a leveling policy of "select such a server 4 that Time is minimized" being set in the leveling unit 15a. In this manner, a stable state in which none of the devices 5 conflict with the request conditional expression "Time≥3" is achieved.

Figure 10:
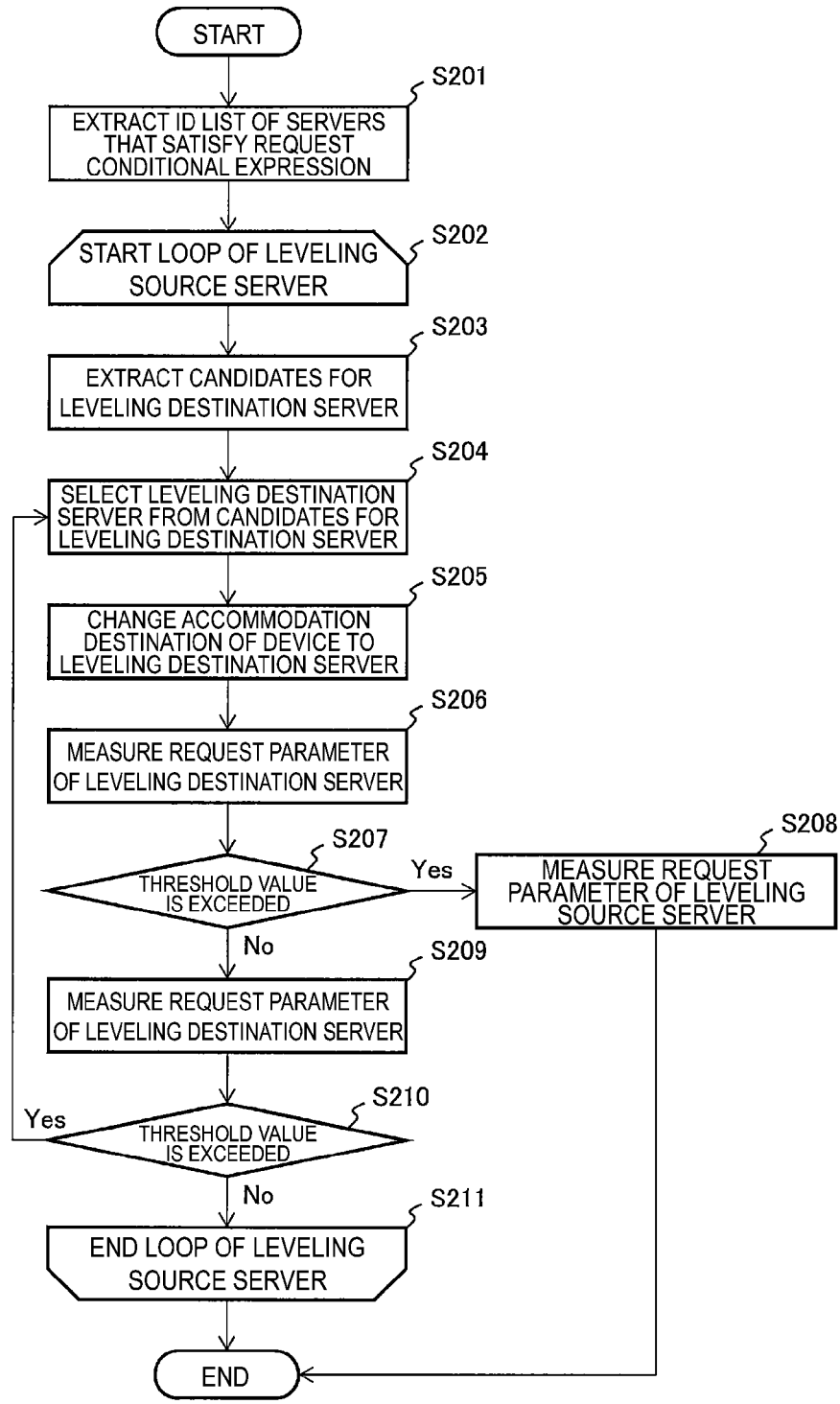
FIG. 10 is a flowchart illustrating leveling processing performed by a leveling unit according to the embodiment.

FIG. 10 is a flowchart illustrating leveling processing performed by the leveling unit 15a.

In S201, the leveling unit 15a extracts an ID list of servers that satisfy the request conditional expression (that exceed the threshold value).

In S202, the leveling unit 15a starts a loop of selecting leveling source servers whose server IDs are included in the list in S201 in order.

In S203, the leveling unit 15a extracts candidates for a leveling destination server with respect to the leveling source servers. A candidate selection algorithm is, for example, an order of apparatus IDs.

In S204, the leveling unit 15a selects the leveling destination server from the candidates in S203 on the basis of a predetermined criterion. The predetermined criterion is, for example, a server with a request parameter that is the furthest from the threshold value of the request conditional expression.

In S205, the leveling unit 15a changes (reallocates) the accommodation destination of the device 5 from the leveling source server to the leveling destination server.

In S206, the leveling unit 15a measures a request parameter of the leveling destination server.

In S207, the leveling unit 15a determines whether or not the measurement result in S206 exceeds the threshold value of the request conditional expression. From S207, the processing proceeds to S208 in the case of Yes, and to S209 in the case of No.

In S208, the leveling unit 15a determines that there is no leveling destination server and moves on to an abnormal end.

In S209, the leveling unit 15a measures the request parameter of the leveling source server.

In S210, the leveling unit 15a determines whether or not the measurement result in S209 exceeds the threshold value of the request conditional expression. In other words, whether or not the request parameter of the leveling source server has been improved is determined in S207. From S210, the processing returns to S204 in the case of Yes, and exits the loop in S211 and moves on to a normal end in the case of No. In S211, the leveling unit 15a ends the loop of the leveling source server from S202.

Note that the leveling unit 15a may appropriately perform not only the measurement processing of the request parameter (S206 and S209) but also additional information measurement required for determining the request conditional expression.

Hereinafter, details of the scale-out unit 15b will be described with reference to FIGS. 11 to 14.

Figure 11:
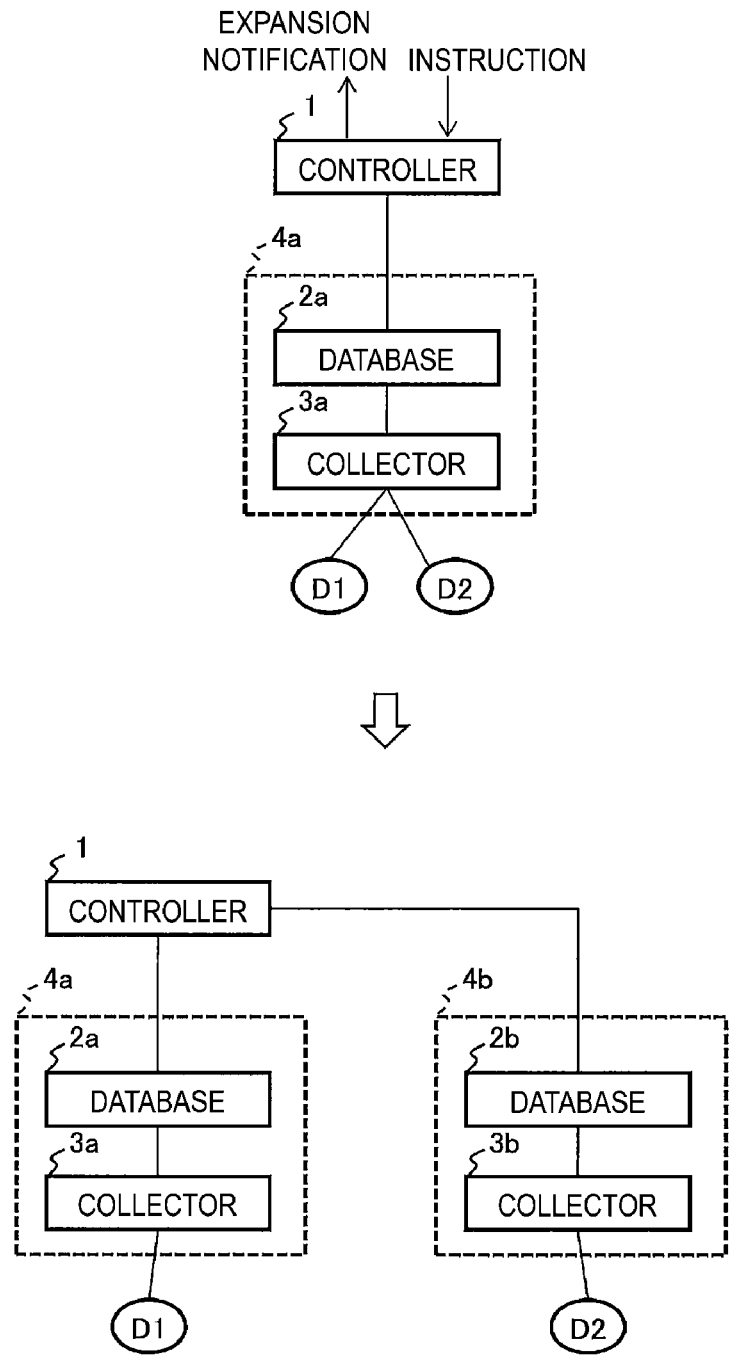
FIG. 11 is an explanatory diagram illustrating an overview of scale-out (expansion) of a server according to the embodiment.

FIG. 11 is an explanatory diagram illustrating an overview of scale-out (expansion) of the server 4. When the request parameter satisfies the request conditional expression, the controller 1 notifies (recommends) the maintenance engineer to expand the database 2b, the collector 3b, or the server 4b. The controller 1 that has received an instruction from the maintenance engineer (that has agreed with the recommendation) calls the scale-out unit 15b and thus utilizes a server 4b that is newly expanded in addition to the existing server 4a.

In a case in which the load of the server 4a accommodating the two devices 5 (D1, D2) has increased, for example, the controller 1 reallocates (levels) one device 5 (D2) to the newly scaled-out server 4b and thus disperses the load. In this manner, the scale-out unit 15b is called when the resources of the servers 4 are short to such an extent that leveling cannot be performed for any servers 4.

Figure 12:
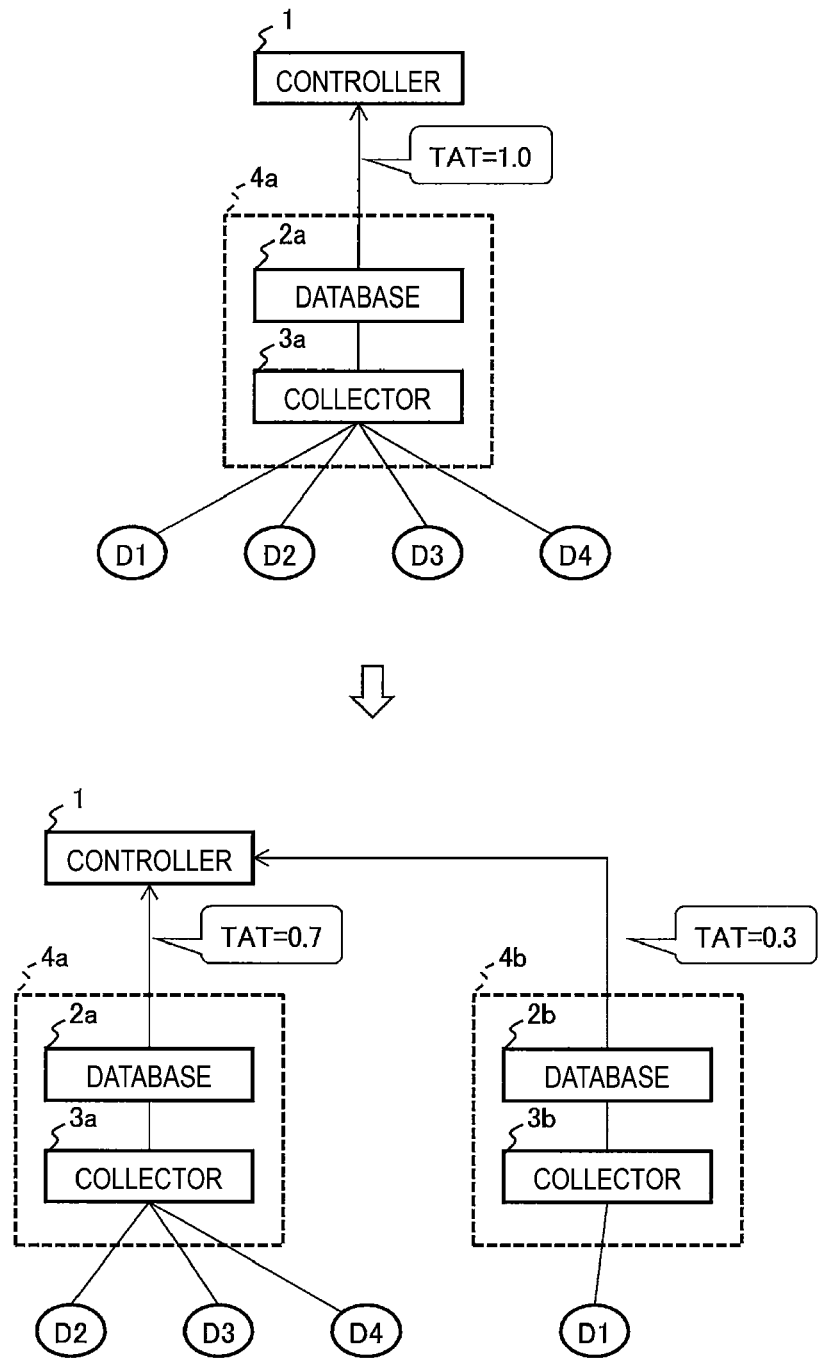
FIG. 12 is an explanatory diagram illustrating processing for improving, through the scale-out, TAT between a database and a controller according to the embodiment.

FIG. 12 is an explanatory diagram illustrating processing for improving a TAT between the database 2a and the controller 1 through scale-out.

Note that TAT measurement processing is activated by option designation or the like when a query of an SQL is put into the database 2a. The TAT measurement result is stored in the measurement management database 14 via the measurement information processing unit 13. First, it is assumed that the following request configuration is registered in the configuration management unit 17.

(First order of priority)=request conditional expression "TAT≥0.8"→requested action "leveling"
(Second order of priority)=request conditional expression "leveling result=false"→requested action "scale out"

In other words, a two-stage request configuration of performing leveling targeted at the database 2a with the TAT of equal to or greater than 0.8 and when the leveling fails, performing scale-out is registered in the configuration management unit 17. The request parameter=TAT, and the TAT measurement result is registered as an attribute in the measurement management database 14.

First, a case is assumed in which the database 2a with the TAT of 1 is selected as a leveling source server in the first order of priority but no leveling destination server thereof is present (S208 in FIG. 10). At this time, the scale-out unit 15b is called in the second order of priority. The scale-out unit 15b recognizes the newly expanded server 4b (the database 2b and the collector 3b).

Then, the leveling unit 15a changes the accommodation destination of the device 5 (D1) from the collector 3a with the TAT≥0.8 to the collector 3b in accordance with the first order of priority again and thus alleviates the load of the database 2a. In this manner, the TAT of the database 2a is improved to be less than the threshold value (TAT=0.7), and the TAT of the database 2b is also less than the threshold value (TAT=0.3).

Figure 13:
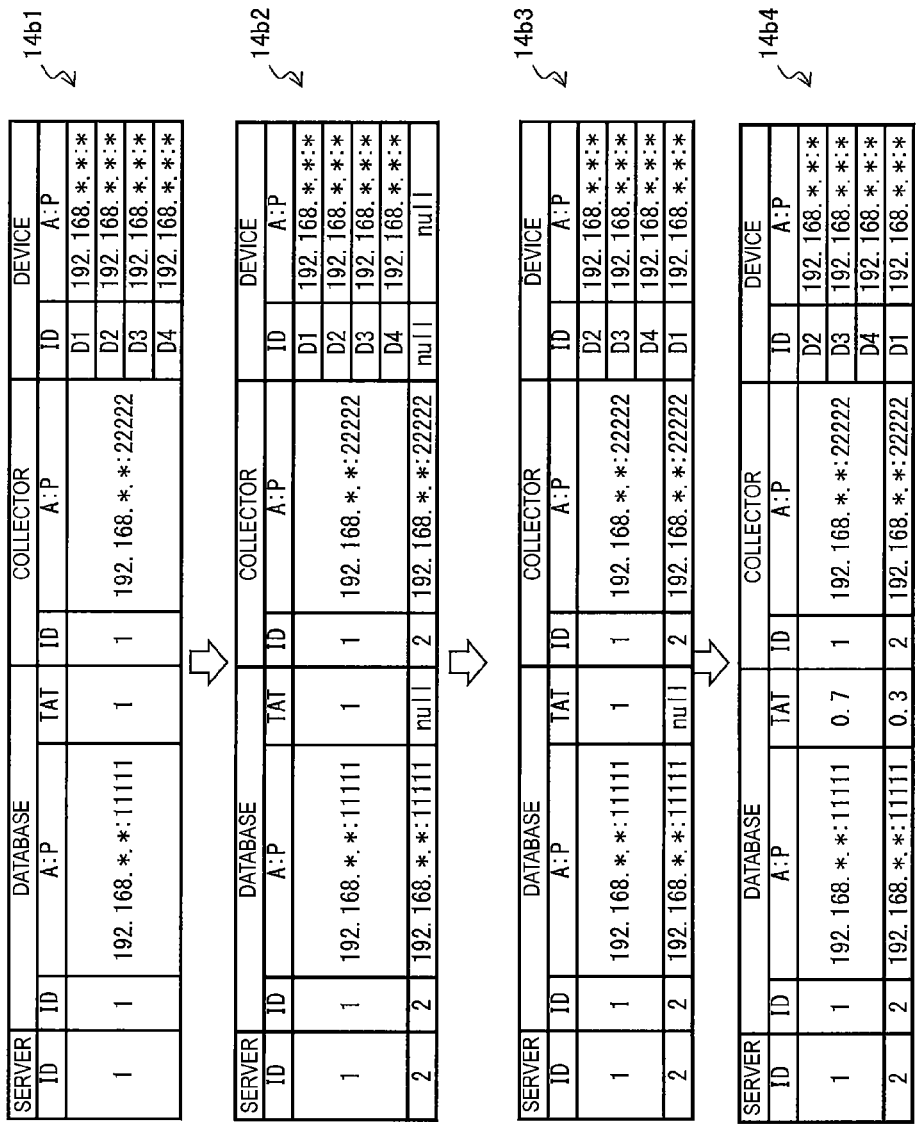
FIG. 13 is a configuration diagram of a measurement management database that shows an improvement effect of the scale-out in FIG. 12 according to the embodiment.

FIG. 13 is a configuration diagram of the measurement management database 14 that shows an improvement effect of the scale-out in FIG. 12.

In a first stage (measurement management database 14b1) state, the initial setting processing in FIG. 5 has ended and the monitoring processing in FIG. 6 has started. Although the measurement control unit 15 discovers the database 2 (ID=1) that satisfies the request conditional expression (that exceeds the threshold value 0.8) (S113, Yes), no leveling destination server thereof is present.

In a second stage (measurement management database 14b2) state, the scale-out unit 15b has detected expansion of the database 2 (ID=2). Because the TAT has not yet been measured immediately after the expansion, "null (unmeasured)" is stored as an attribute value of the TAT.

In a third stage (measurement management database 14b3) state, the leveling unit 15a has reallocated the device 5 (ID=D1).

In a fourth stage (measurement management database 14b4) state, the measurement information processing unit 13 has received TAT remeasurement results from two databases 2 and has updated the attribute of the measurement management database 14. In this manner, the TAT of the database 2a is improved to be less than the threshold value (TAT=0.7), and the TAT of the database 2b is also less than the threshold value (TAT=0.3).

Figure 14:
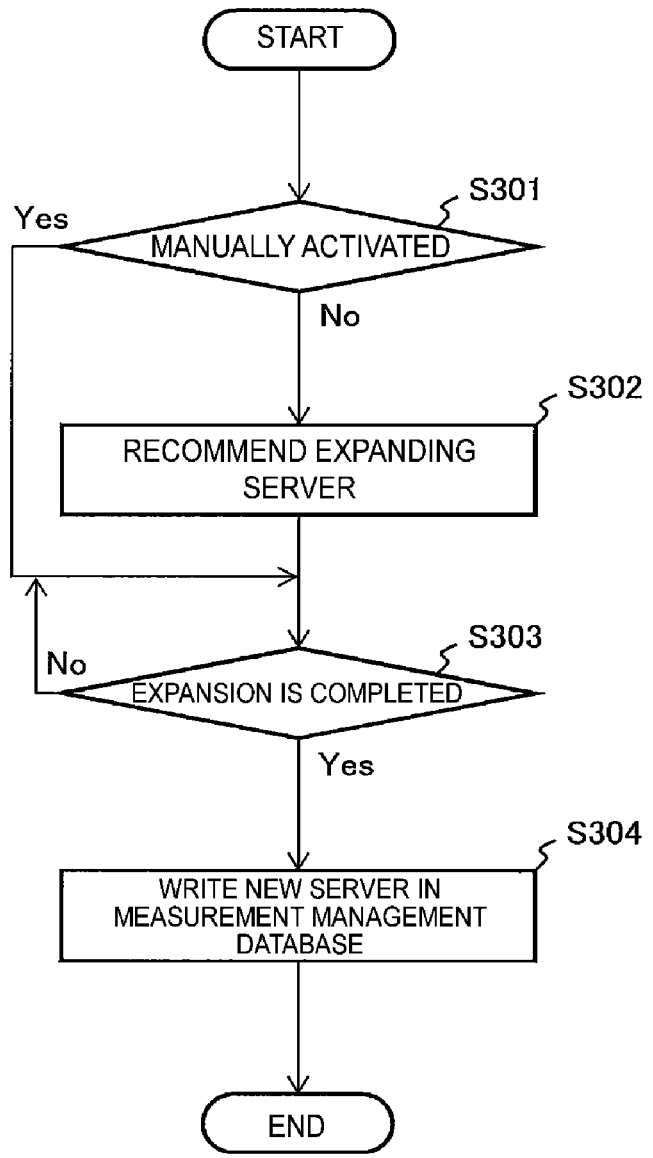
FIG. 14 is a flowchart illustrating scale-out processing performed by a scale-out unit according to the embodiment.

FIG. 14 is a flowchart illustrating scale-out processing performed by the scale-out unit 15b.

In S301, the scale-out unit 15b determines whether or not the scale-out unit 15b has been manually activated by the maintenance engineer. In a case in which the measurement control unit 15 activates the scale-out unit 15b from the request action in S114, the determination of S301 is No. From S301, the processing proceeds to S303 in the case of Yes, and to S302 in the case of No.

In S302, the request input/output unit 12 follows the request configuration and notifies the maintenance engineer of a recommendation of expansion of the server 4.

In S303, the request input/output unit 12 determines whether or not completion of expansion of the server 4 has been input from the maintenance engineer. From S303, the processing proceeds to S304 in the case of Yes, and repeats S303 in the case of No.

In S304, the scale-out unit 15b writes information (such as topology information and measurement information) regarding the new server 4 input in S303 in the measurement management database 14. In this manner, the measurement control unit 15 restarts monitoring processing of the request parameter in accordance with the request configuration.

Hereinafter, details of the scale-in unit 15c will be described with reference to FIGS. 15 to 18.

Figure 15:
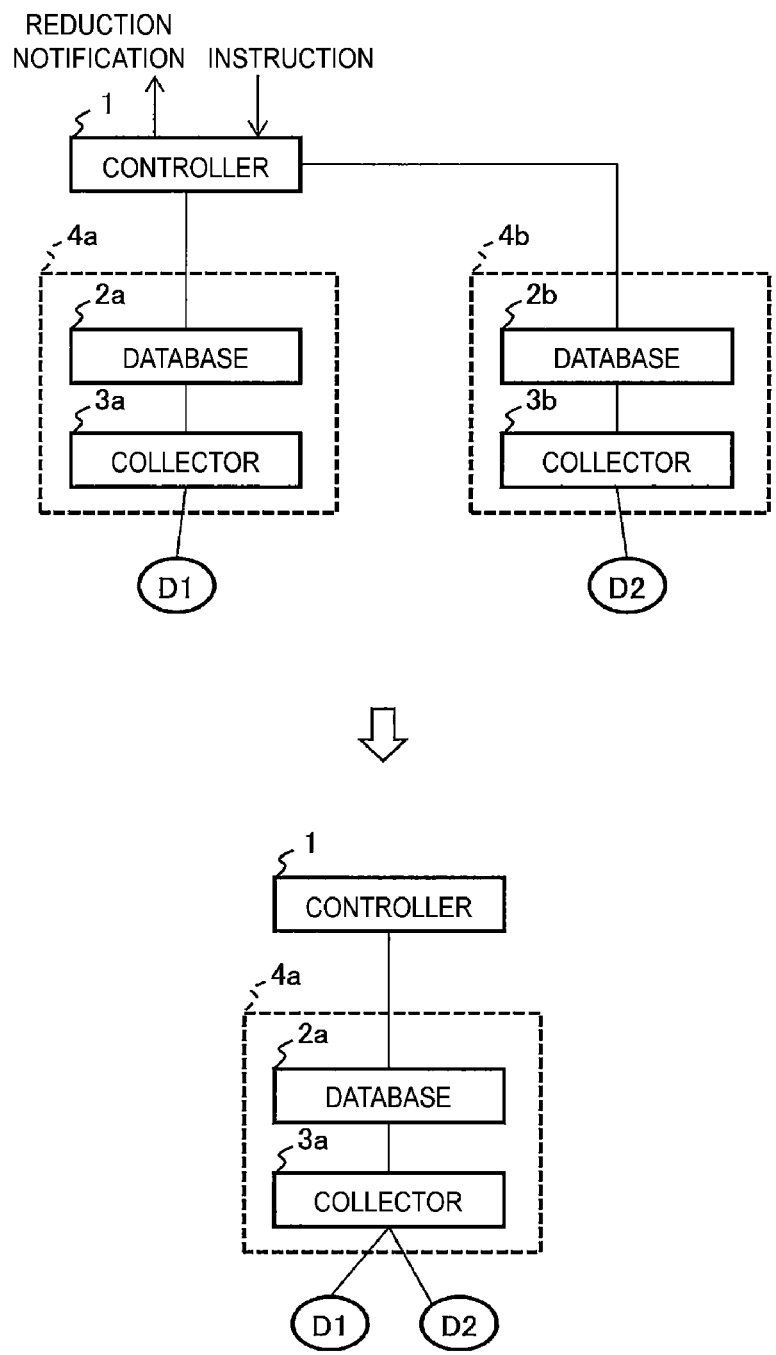
FIG. 15 is an explanatory diagram illustrating an overview of scale-in (reduction) of a server according to the embodiment.

FIG. 15 is an explanatory diagram illustrating an overview of scale-in (reduction) of the server 4. The scale-in unit 15c notifies the maintenance engineer of recommendation of reducing one server 4 on the basis of the fact that both two servers 4 accommodate only one device 5 and there is room for the load.

The scale-in unit 15c obtains an instruction from the maintenance engineer (agreement with the recommendation) and executes scale-in of degenerating the server 4b and unifying the servers into the server 4a. To do so, the accommodation of device 5 (D2) is changed from the server 4b to the server 4a (destination change instruction) first. Then, at the timing when there is no longer a device 5 accommodated by the server 4b, the measurement control unit 15 deletes information regarding the server 4b from the measurement management database 14. Further, the maintenance engineer reduces the server 4b.

It is thus possible to transition to an efficient configuration in which excessive resources of the server 4 are deleted, by the single server 4a accommodating the two devices 5 (D1, D2).

Figure 16:
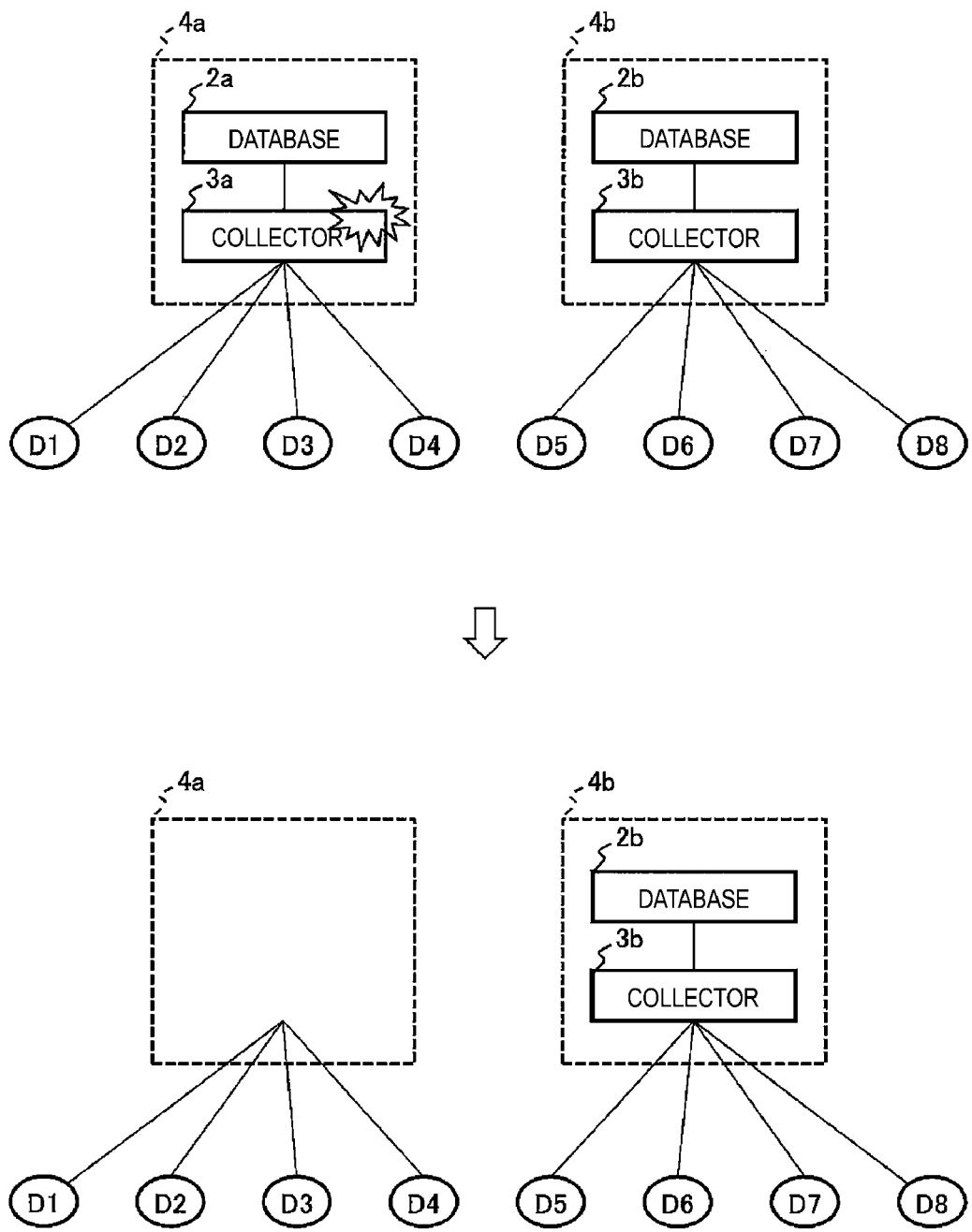
FIG. 16 is an explanatory diagram illustrating processing for performing a failover measure through the scale-in (reduction) when the collector according to the embodiment breaks down.

FIG. 16 is an explanatory diagram illustrating processing for performing a failover measure through the scale-in (reduction) when the collector 3 breaks down.

It is assumed that in a first stage, a failure has occurred in the collector 3a. At this time, the collector 3a accommodates four devices 5 (D1 to D4), and the collector 3b accommodates four devices 5 (D5 to D8).

In a second stage, the scale-in unit 15c follows a manual instruction from the maintenance engineer obtained via the request input/output unit 12 and deletes the collector 3a and the database 2a from the measurement management database 14. In this manner, the four devices 5 (D1 to D4) activate the leveling unit 15a in response to the situation in which there is temporarily no accommodation destination.

Figure 17:
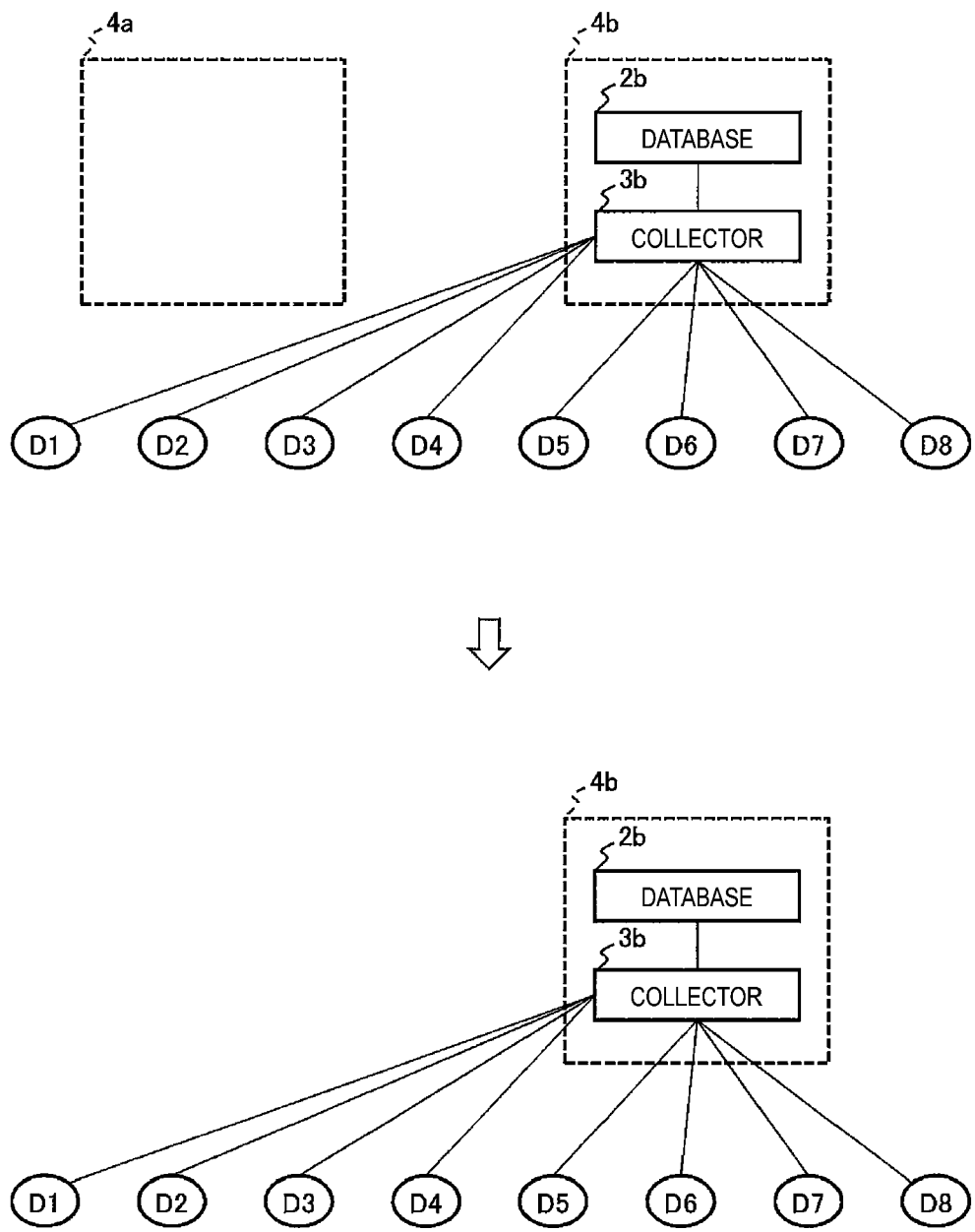
FIG. 17 is an explanatory diagram continuing from FIG. 16, illustrating processing for performing the failover measure, according to the embodiment.

FIG. 17 is an explanatory diagram continuing from FIG. 16, illustrating processing for performing the failover measure.

In a third stage, the leveling unit 15a searches for a new accommodation destination (leveling destination server) of the four devices 5 (D1 to D4). Here, the server 4b is selected as a leveling destination server in accordance with a policy of leveling the number of devices 5 that the server 4 accommodates, for example. Eight devices 5 (D1 to D8) are accommodated in the server 4b, and each of the devices restarts operation.

In a fourth stage, the maintenance engineer manually removes the server 4a.

Figure 18:
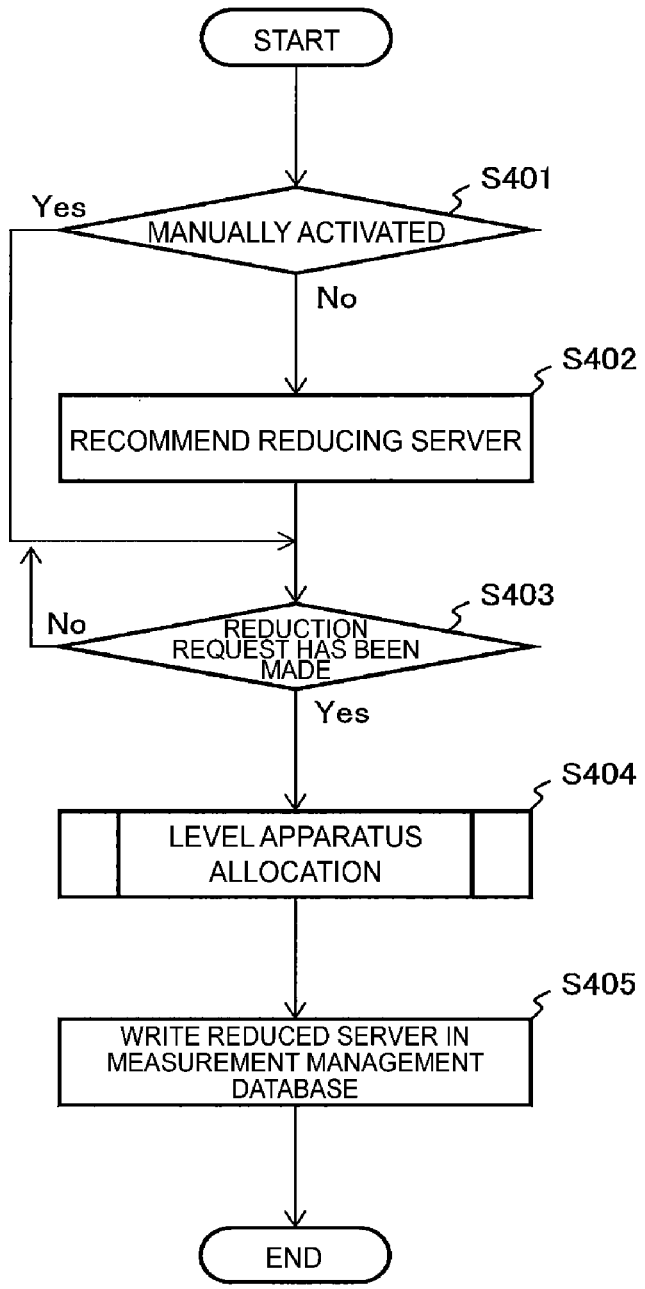
FIG. 18 is a flowchart illustrating scale-in processing performed by a scale-in unit according to the embodiment.

FIG. 18 is a flowchart illustrating scale-in processing performed by the scale-in unit 15c.

In S401, whether or not the scale-in unit 15c has been manually activated by the maintenance engineer is determined. In a case in which the measurement control unit 15 activates the scale-in unit 15c from the requested action in S114, the determination of S401 is No. From S401, the scale-in processing proceeds to S403 in the case of Yes or to S402 in the case of No.

In S402, the request input/output unit 12 follows the request configuration and notifies the maintenance engineer of a recommendation of reduction of the server 4.

In S403, the request input/output unit 12 determines whether or not a reduction request of the server 4 has been input by the maintenance engineer. Note that the reduction request includes a policy employed when a new accommodation destination (leveling destination server) is selected in addition to a reduction target server ID (leveling source server). From S403, the processing proceeds to S404 in the case of Yes, and repeats S403 in the case of No.

In S404, the leveling unit 15a follows the policy input in S403 and levels apparatus allocation (calls FIG. 10).

In S405, the scale-in unit 15c writes, in the measurement management database 14, information regarding the reduction request input in S403 (a change in topology information of the leveling source server to the leveling destination server, reduction of the leveling source server, and the like).

In the aforementioned embodiment, the network measurement management technology performed by the controller 1 has been described. The controller 1 manages the request configuration input by the maintenance engineer using the configuration management unit 17 and writes the result of monitoring the request parameter described in the request configuration as an attribute of the measurement management database 14, thereby managing various resources (the database 2, the collector 3, and the devices 5).

When the attribute of the measurement management database 14 satisfies the request conditional expression, the requested action is activated. An improvement in the request parameter is enabled by executing each of the leveling unit 15a, the scale-out unit 15b, and the scale-in unit 15c as the requested action. It is possible for the maintenance engineer to appropriately set the request parameter via the request input/output unit 12 and thereby for the request parameter on which each maintenance engineer places importance to be flexibly addressed.

Note that the network system that the controller 1 manages is not limited to the three databases 2, the four collectors 3, and the ten devices 5 as illustrated in FIG. 3, and any number of resources may be handled in the embodiment.

The embodiment can be realized by a program that causes hardware resources of a general computer to operate as each means of the controller 1. This program may also be distributed over a communications line or may be recorded and distributed on a recording medium such as a CD-ROM.

REFERENCE SIGNS LIST

1 Controller (network management apparatus)
2 Database
3 Collector
4 Server
5 Device
11 Measurement information input/output unit
12 Request input/output unit (request input unit)
13 Measurement information processing unit
14 Measurement management database
15 Measurement control unit
15a Leveling unit
15b Scale-out unit
15c Scale-in unit
16 Apparatus setting unit
17 Configuration management unit

The invention claimed is:

1. A network management apparatus comprising:
one or more processors for executing computer-readable code, the computer-readable code causing the one or more processors to:
receive an input of a request configuration that includes a list of multiple request conditional expressions, each request conditional expression including a respective calculation expression of a respective request parameter and a respective requested action and store the request configuration in a configuration management unit, wherein the list of multiple request conditional expressions is ordered according to a priority order; and
for each request conditional expression in the list of multiple request conditional expressions, perform in the priority order:
acquiring measurement information of a device, the measurement information designated as the respective request parameter of the request conditional expression, or measurement information of a server that accommodates one or more devices including the device, and storing the acquired measurement information in a measurement management database;
determining whether or not the measurement information in the measurement management database satisfies the request conditional expression and activating the respective requested action when the request conditional expression is determined to be satisfied; and configuring setting information that follows the activated requested action in the device or the server.

2. The network management apparatus according to claim 1, wherein the one or more processors are further configured to level loads between a plurality of servers, as the requested action, and to store the request configuration when the measurement information designated as the request parameter exceeds a first threshold value.

3. The network management apparatus according to claim 2, wherein one or more processors are further configured to address expansion of a new server as the requested action, and to store the request configuration when the measurement information designated as the request parameter exceeds the first threshold value even after leveling the loads is performed.

4. The network management apparatus according to claim 2, wherein the one or more processors are further configured to address reduction of an existing server as the requested action, and to store the request configuration when the measurement information designated as the request parameter is below a second threshold value.

5. A network management method, executed by a network management apparatus which includes one or more processors for executing computer-readable code, the method comprising:

receiving an input of a request configuration that includes a list of multiple request conditional expressions, each request conditional expression including a respective calculation expression of a respective request parameter and a respective requested action and storing the request configuration in a configuration management unit; and for each request conditional expression in the list of multiple request conditional expressions, performing in the priority order:

acquiring measurement information of a device, the measurement information designated as the respective request parameter of the request conditional expression, or measurement information of a server that accommodates one or more devices including the device, and storing the acquired measurement information in a measurement management database;

determining whether or not the measurement information in the measurement management database satisfies the request conditional expression and activating the corresponding requested action when the request conditional expression is determined to be satisfied; and configuring setting information that follows the activated requested action in the device or the server.

6. The network management method according to claim 5, further comprising:

leveling loads between a plurality of servers; and storing the request configuration when the measurement information designated as the request parameter exceeds a first threshold value.

7. The network management method according to claim 6, further comprising:

addressing expansion of a new server; and storing the request configuration when the measurement information designated as the request parameter exceeds the first threshold value even after leveling the loads is performed.

8. The network management method according to claim 6, further comprising:

addressing reduction of an existing server; and storing the request configuration when the measurement information designated as the request parameter is below a second threshold value.

* * * * *